(12) United States Patent
Nguyen et al.

(10) Patent No.: US 8,944,089 B2
(45) Date of Patent: Feb. 3, 2015

(54) BALANCED VALVE PORT FOR FLUID REGULATOR

(71) Applicant: Emerson Process Management Regulator Technologies, Inc., McKinney, TX (US)

(72) Inventors: Tung K. Nguyen, McKinney, TX (US); Jason Scott Mevius, McKinney, TX (US); Biao Zhou, Sichuan (CN)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 150 days.

(21) Appl. No.: 13/659,041

(22) Filed: Oct. 24, 2012

(65) Prior Publication Data
US 2014/0090727 A1 Apr. 3, 2014

(30) Foreign Application Priority Data
Sep. 28, 2012 (CN) .......................... 2012 1 0377054

(51) Int. Cl.
*G05D 11/00* (2006.01)
(52) U.S. Cl.
USPC .................................. 137/116.5; 137/505.18
(58) Field of Classification Search
USPC ................. 137/505.18, 505.47, 116.5; 251/50
See application file for complete search history.

(56) References Cited

U.S. PATENT DOCUMENTS

| | | | | |
|---|---|---|---|---|
| 2,707,966 A | * | 5/1955 | Taplin | 137/116.5 |
| 3,525,356 A | * | 8/1970 | Cameron et al. | 137/505.15 |
| 6,354,319 B1 | * | 3/2002 | Mooney | 137/14 |
| 8,281,803 B2 | * | 10/2012 | Mevius et al. | 137/505.46 |
| 8,469,052 B2 | * | 6/2013 | Jorgensen | 137/501 |
| 2009/0261281 A1 | * | 10/2009 | Mevius et al. | 251/118 |
| 2010/0071786 A1 | | 3/2010 | Hawkins et al. | |
| 2014/0083530 A1 | * | 3/2014 | Fan | 137/505.18 |
| 2014/0090719 A1 | * | 4/2014 | Mevius et al. | 137/15.24 |

OTHER PUBLICATIONS

Search Report for PCT/US2013/062109, mailed Jan. 29, 2014.
Written Opinion for PCT/US2013/062109, mailed Jan. 29, 2014.

* cited by examiner

*Primary Examiner* — Stephen M Hepperle
*Assistant Examiner* — R. K. Arundale
(74) *Attorney, Agent, or Firm* — Marshall, Gerstein & Borun LLP (57) ABSTRACT

A balanced port control assembly includes a control element with a valve plug coupled to a valve stem and a pressure sensing labyrinth defined at least partly by the valve plug. The pressure sensing labyrinth provides for fluid communication between a sealing surface of the valve plug and a balancing diaphragm carried internally of the control element. The pressure sensing labyrinth includes at least one pressure sensing passage extending from the sealing surface and into the valve plug along a central longitudinal axis of the control element. So configured, fluid pressure resident on the sealing surface of the valve plug is also resident on the balancing diaphragm such that equal and opposite forces are applied to the control element.

12 Claims, 7 Drawing Sheets

FIG. 1

PRIOR ART

BALANCED VALVE PORT FOR FLUID REGULATOR

CROSS-REFERENCE TO RELATED APPLICATIONS

Priority is claimed to Chinese Patent Application No. 201210377054.0, filed Sep. 28, 2012, the entire contents of which are expressly incorporated herein by reference.

FIELD OF THE DISCLOSURE

The present application is directed to gas regulators and, more particularly, to gas regulators having balanced valve ports.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a balanced valve port to improve the reaction of the gas regulator to variations in the downstream pressure. The balanced valve port is adapted to reduce the influence of the inlet pressure on the performance of the gas regulator. The inlet pressure is placed in fluid communication with a balancing diaphragm to apply a force to the control element of the gas regulator in the opposite direction as the force of the inlet pressure. Accordingly, as the inlet pressure varies, a corresponding force is applied to balance the force created by the inlet pressure as described further below so that the gas regulator acts in response to the outlet pressure only.

As will be described more fully, in conventional regulators having a balanced valve port, a portion of the fluid flowing through the gas regulators may travel through passages disposed within the control element, and the passages open to a balancing cavity that is at least partially defined by the balancing diaphragm. Such a configuration allows for high flow capacity at low inlet pressures. However, as the valve opens, the inlet pressure bearing on the balancing diaphragm does not remain constant. More specifically, the sensing pressure can reduce as the valve opens, resulting in a phenomenon known as "droop" and instability in the gas regulator.

SUMMARY

One aspect of the present disclosure comprises a fluid regulating device including a valve body defining an inlet, an outlet, and a valve port disposed between the inlet and the outlet. The device can further include a port housing disposed in the valve body and defining a central cylindrical opening. The device can further include a control element at least partly slidably disposed in the central cylindrical opening of the port housing and adapted for displacement along a central axis of the control element between a closed position engaging the valve port and an open position spaced away from the valve port. The control element can comprise a valve stem and a valve plug coupled to the valve stem, the valve plug defining a sealing surface adapted to sealingly engage the valve port when the control element is in the closed position. The device can further include a balancing diaphragm coupled between the control element and the port housing. The balancing diaphragm can have opposite first and second diaphragm surfaces. The device can further include a balancing cavity defined in a portion of the port housing between an inner surface of the port housing and the first diaphragm surface of the balancing diaphragm. Finally, the device can further include a first pressure sensing passage extending through the valve plug and in fluid communication with the balancing cavity such that a fluid pressure resident on the sealing surface of the valve plug is also resident in the balancing cavity to apply equal and opposite first and second forces to the sealing surface of the valve plug and the first surface of the balancing diaphragm, respectively. The first pressure sensing passage has an inlet portion extending through the valve plug along the central axis of the control element.

Another aspect of the present disclosure includes a balanced port control assembly for a fluid flow control device including a port housing defining a central cylindrical opening. The assembly can further include a valve stem having a central longitudinal axis and being at least partly disposed in the port housing for reciprocating displacement along the central longitudinal axis. The assembly can further include a valve plug coupled to the valve stem and defining a sealing surface adapted to selectively sealingly engage a valve port of the fluid flow control device. The assembly can further include a balancing diaphragm operably coupled between the valve plug and the port housing, wherein the balancing diaphragm has opposite first and second diaphragm surfaces. The assembly can further include a balancing cavity defined in a portion of the port housing between an inner surface of the port housing and the first diaphragm surface of the balancing diaphragm. Finally, the assembly can further include a first pressure sensing passage extending through the valve plug and in fluid communication with the balancing cavity such that a fluid pressure resident on the sealing surface of the valve plug is also resident in the balancing cavity to apply equal and opposite first and second forces to the sealing surface of the valve plug and the first surface of the balancing diaphragm, respectively. The first pressure sensing passage has an inlet portion extending through the valve plug along the central longitudinal axis of the valve stem.

Yet another aspect of the present disclosure includes a balanced port control assembly for a fluid flow control device including a port housing defining a central cylindrical opening. The assembly can further include a valve stem having a central longitudinal axis and being at least partly disposed in the port housing for reciprocating displacement along the central longitudinal axis. The assembly can further include a valve plug coupled to the valve stem and defining a sealing surface adapted to selectively sealingly engage a valve port of the fluid flow control device. The assembly can further include a balancing diaphragm operably coupled between the valve plug and the port housing, wherein the balancing diaphragm has opposite first and second diaphragm surfaces. The assembly can further include a balancing cavity defined in a portion of the port housing between an inner surface of the port housing and the first diaphragm surface of the balancing diaphragm. Finally, the assembly can further include a pressure sensing labyrinth defined at least partly by the valve plug and providing fluid communication between the sealing surface of the valve plug and the balancing cavity such that fluid pressure resident on the sealing surface of the valve plug is also resident in the balancing cavity to apply equal and opposite first and second forces to the sealing surface of the valve plug and the first surface of the balancing diaphragm, respectively. The pressure sensing labyrinth includes at least one first pressure sensing passage including extending from the sealing surface and into the valve plug along the central axis of the control element.

DETAILED DESCRIPTION

Figure 1:
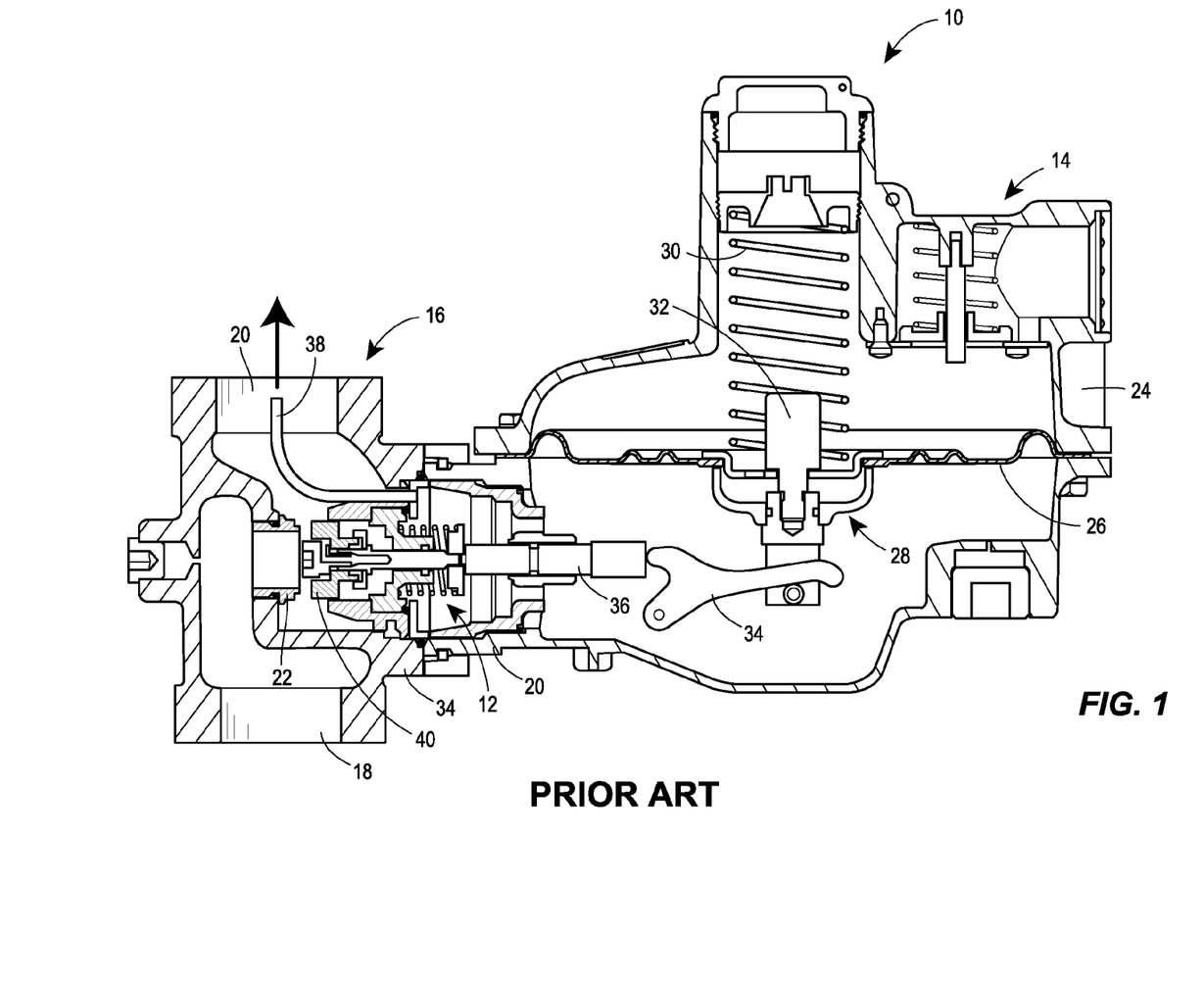
FIG. 1 is a cross-sectional side view of a regulator equipped with one version of a conventional balanced port control assembly.

FIG. 1 depicts a fluid flow control device 10 (e.g., a gas regulator) including one version of a conventional balanced port control assembly 12. Additionally, the depicted fluid flow control device 10 includes an actuator 14 coupled to a valve body 16. The valve body 16 includes an inlet 18, an outlet 20, and a valve port 22 disposed between the inlet 18 and the outlet 20. The actuator 14 is a diaphragm-based actuator and includes an actuator housing 24 containing a diaphragm 26 and a control assembly 28. The control assembly 28 is operably coupled to a movable control element 40 of the balanced port control assembly 12. In more detail, the control assembly 28 includes a control spring 30 disposed above the diaphragm 26 and a control piston 32 extending through and below the diaphragm 26. The control piston 32 is operatively connected to a lever 34 that selectively drives an actuator stem 36.

In the conventional fluid flow control device 10 of FIG. 1, the control spring 30 biases the diaphragm 26 and control piston 32 downward, while pressure from the outlet 20 of the valve body 16 is communicated to the underside of the diaphragm 26 to offset the force applied by the control spring 30. In FIG. 1, a pitot tube 38 is provided to communicate outlet pressure to the underside of the diaphragm 26, but this is merely an example for descriptive purposes. Other versions of the disclosed fluid flow control device 10 can accomplish this communication without the pitot tube 38, or with external piping, or otherwise, for example. So constructed, during normal operation of the fluid flow control device 10, the actuator 14 controls the position of the control element 40 of the balanced port control assembly 12 between a closed position sealing the valve port 22 of the valve body 16, as shown in FIG. 1, and an open position spaced away from the valve port 22 in a known manner.

Figure 2:
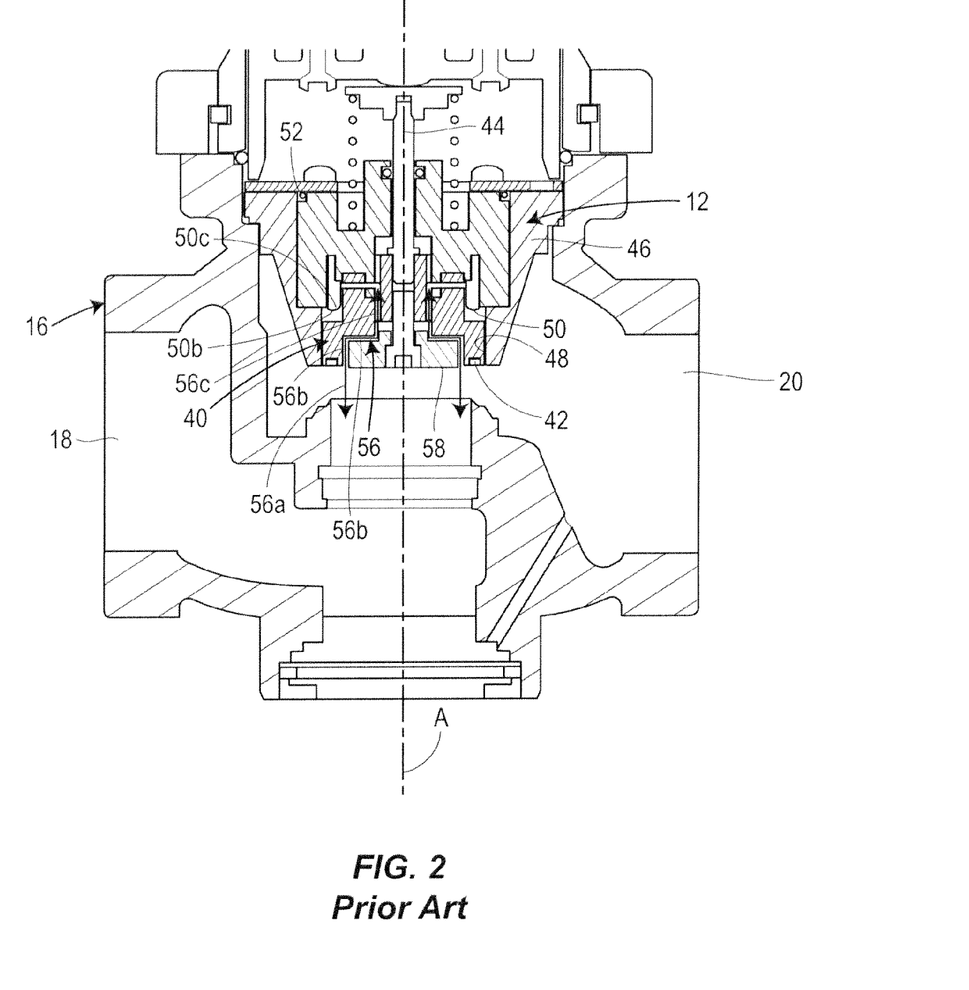
FIG. 2 is a cross-sectional side view of a second version of a conventional balanced port control assembly for use in a regulator such as that depicted in FIG. 1.

Referring now to FIG. 2, one conventional balanced port control assembly 12 will be described. The assembly 12 depicted in FIG. 2 is slightly different than the assembly 12 depicted in FIG. 1, but generally operates the same. As shown in FIG. 2, the control element 40 of the depicted conventional balanced port control assembly 12 includes a valve plug 42 fixed to a valve stem 44 for sliding displacement along a central longitudinal axis A in response to operation of the actuator 14 (shown in FIG. 1). The assembly 12 further includes a port housing 46 that defines a central cylindrical opening 48, in which the valve plug 42 is slidably disposed. Moreover, the assembly 12 includes a balancing diaphragm 50 connected between the port housing 46 and the control element 40. A balancing cavity 52 is defined in the port housing 46 between the balancing diaphragm 50 and the inner surface 54 of the port housing 46. Finally, the control element 40 defines one or more pressure sensing passages 56 providing fluid communication between a sealing surface 58 of the valve plug 42 and the balancing cavity 52. The one or more pressure sensing passages 56 are provided such that inlet fluid pressure acting on the sealing surface 58 of the valve plug 42 is communicated to the balancing cavity 52 and applied to the balancing diaphragm 50. The forces applied to the sealing surface 58 and the balancing diaphragm 50 are equal and opposite such as to minimize the effects of fluid inlet pressures on the operation of the fluid flow control device 10.

As illustrated, in the conventional control element 40, the one or more pressure sensing passages 56 include one or more tortuous passages having inlet portions 56a that are disposed parallel to and spaced radially outward from the central axis A of the control element 40. In some versions, the inlet portions 56a of the one or more pressure sensing passages 56 can include a plurality of circumferentially spaced through-bores extending through the valve plug 42. In another version, the one or more pressure sensing passages 56 can include a single inlet portion 56a defined by a single hollow-cylinder shaped gap disposed between concentrically located inner and outer portions 42a, 42b of the valve plug 42. Regardless, as shown, the inlet portion(s) 56a transition to one or more radially inward directed portions 56b, then to one or more axially directed portions 56c, then to one or more radially outward directed portions 56d, and finally to the balancing cavity 52 to apply a force to a top surface of the balancing diaphragm 50.

Figure 3:
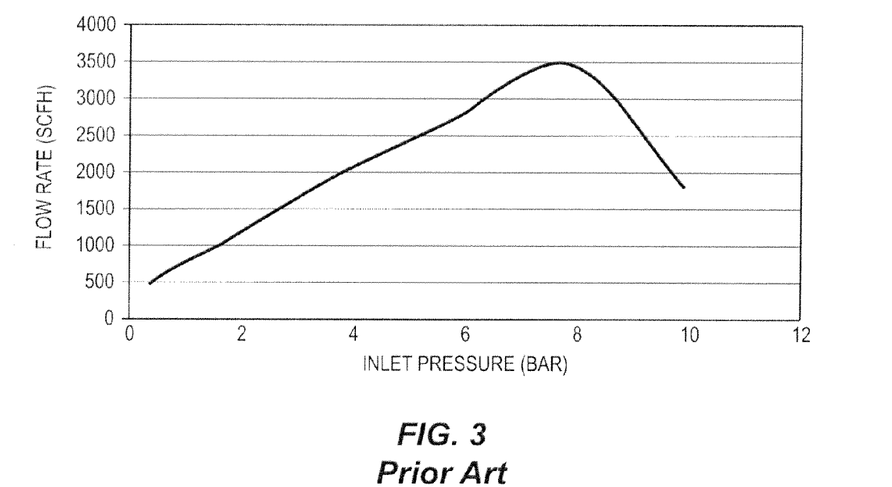
FIG. 3 is graph illustrating flow capacity versus inlet pressure of the conventional balanced port control assembly of FIG. 2.

While the foregoing conventional balanced valve port control element 12 sufficiently communicates pressure to the balancing cavity 52 under many operational situations, its performance falls off at relatively high inlet pressures. For example, with reference to FIG. 3, testing has shown that up to approximately 8 bars of inlet pressure (i.e., pressure at the inlet 18 of the valve body 16), the conventional assembly 12 of FIG. 2 provides for a rated flow capacity that steadily increases. However, as the inlet pressure rises above approximately 8 bars, the rated flow capacity starts to decrease, which can be undesirable.

Figure 4:
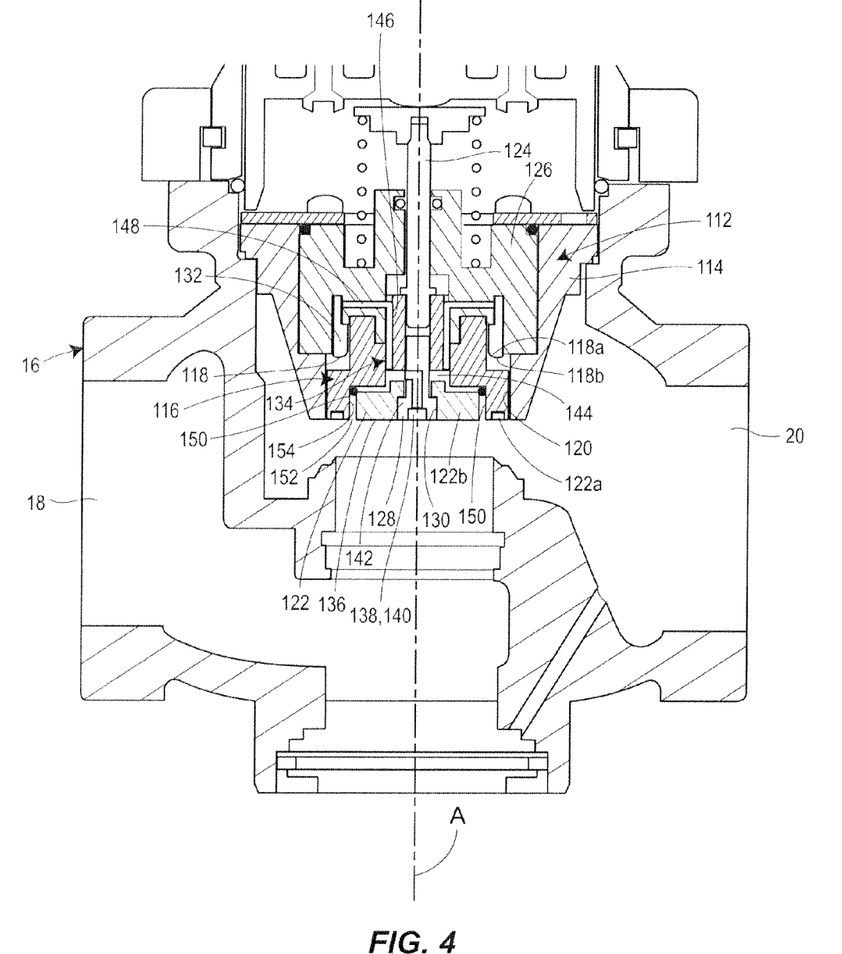
FIG. 4 is a cross-sectional side view of a first version of a balanced port control assembly of the present disclosure adapted for use in a regulator such as that depicted in FIG. 1, for example.

Therefore, FIG. 4 depicts one version of a balanced port control assembly 112 constructed in accordance with the principles of the present disclosure and mounted in the valve body 16 of the fluid flow control device 10 of FIG. 1. The control assembly 112 is constructed similar to the control assembly 12 described with reference to FIG. 2, with various exceptions that will be described. As shown, the control assembly 112 includes a port housing 114, a control element 116, and a balancing diaphragm 118. The port housing 114 defines a central cylindrical opening 120 in which the control element 116 is slidably disposed along a central longitudinal axis A of the control element 116. The control element 116 includes a valve plug 122 and a valve stem 124. The valve plug 122 is threadably connected to an end of the valve stem 124 via a plug connector 126 and a threaded fastener 128 passing through a central bore 130 of the valve plug 122. The balancing diaphragm 118 is connected between the port housing 114 and the control element 116 in a known manner to define a balancing cavity 132 inside of the port housing 114. More particularly, in the disclosed version, the balancing diaphragm 118 includes opposite first and second surfaces 118a, 118b, the first surface 118a faces upward relative to the orientation of FIG. 4 and, therefore, defines a bottom surface of the balancing cavity 132.

The valve plug 122 includes an outer plug portion 122a and an inner plug portion 122b disposed radially inside of the outer plug portion 122a. In the version depicted in FIG. 4, the control element 116 defines a pressure sensing labyrinth 134 that provides fluid communication between a sealing surface 136 of the valve plug 122 and the balancing cavity 132 such that equal and opposite first and second forces are applied to the sealing surface 136 and the first surface 118a of the balancing diaphragm 118, respectively, during operation of the device 10. In FIG. 4, the pressure sensing labyrinth 134 includes at least one first pressure sensing passage 138 defined by the threaded fastener 128 securing the valve plug 122 to the valve stem 124 via the plug connector 126. More specifically, the threaded fastener 128 includes a bore 140, at least a portion of which defines the first pressure sensing passage 138. That is, the bore 140 includes a first portion 140a extending into the fastener 128 from a head portion 142 of the fastener 128 and along the central axis A of the control element 116. The bore 140 further includes a second portion 140b extending perpendicular to and radially outward from the first portion 140a and out of the radial sidewall of the fastener 128. Thus, as can be seen, at least the first portion 140a of the through-bore 140 defines the first pressure sensing passage 138 of the pressure sensing labyrinth 134, and is located in the center of the valve plug 122 and extends through the central bore 130 as it extends toward the balancing cavity 132. As is further illustrated, as the second portion 140b of the bore 140 exits the sidewall of the fastener 128, it transitions to or communicates with one or more first radially outward directed portions 144 of the pressure sensing labyrinth 134, then to one or more axially directed portions 146 of the pressure sensing labyrinth 134, then to one or more second radially outward directed portions 148 of the pressure sensing labyrinth 134, and finally to the balancing cavity 132 to apply a force to the first surface 118a of the balancing diaphragm 118. In the disclosed version, the one or more first radially outward directed portions 144 can be defined by a gap axially disposed between the plug connector 126 and the inner plug portion 122b of the valve plug 122. Moreover, the one or more axially directed portions 146 and the one or more second radially outward directed portions 148 can be defined by one or more bores formed (e.g., machined) in the plug connector 126. Other configurations of the control element 116 and various passages of the labyrinth 134 are intended to be within the scope of the present disclosure.

As is further illustrated in FIG. 4, the pressure sensing labyrinth 134 of the present version of the balanced port control assembly 112 further includes at least one second pressure sensing passage 150 extending through the valve plug 122 and, more particularly, being disposed between the outer and inner plug portions 122a, 122b. The at least one second pressure sensing passage 150 can be defined as being located between an outer radial surface 152 of the inner plug portion 122b and an inner radial surface 154 of the outer plug portion 122a. In some versions, the at least one second pressure sensing passage 150 can include a plurality of circumferentially spaced bores in the valve plug 122, each disposed parallel to and spaced radially outward away from the first pressure sensing passage 138 and, therefore, also parallel to and spaced radially outward away from the central longitudinal axis A of the control element 116. In other versions, the at least one second pressure sensing passage 150 can include a hollow-cylinder shaped gap or space disposed between the inner and outer plug portions 122b, 122a. Regardless of the specific configuration, the at least one second pressure sensing passage 150 communicates directly with the one or more first radially outward directed portions 144 and to the balancing cavity 132 along the remainder of the pressure sensing labyrinth 134 in a manner similar to the first pressure sensing passage 128 described above. However, in the specific embodiment depicted in FIG. 4, the at least one second pressure sensing passage 150 is blocked or sealed such that fluid cannot pass through to the remainder of the labyrinth 134. In one embodiment where the second pressure sensing passage 150 includes a hollow-cylinder shaped gap, a seal member 156, such as an o-ring, can be disposed in the second pressure sensing passage 150, as shown. In other versions, where the at least one second pressure sensing passage 150 includes a plurality of vertical bores, the seal member 156 can include a plurality of sealing balls or other material forced into the individual bores. Regardless of the specific configuration, the seal member 150 provides a fluid tight seal between the outer radial surface 152 of the inner plug portion 122b and the inner radial surface 154 of the outer plug portion 122a. With the at least one second pressure sensing passage 150 sealed as described, only the first pressure sensing passage 138 provides fluid communication to the balancing cavity 132 via the labyrinth 134.

Figure 5:
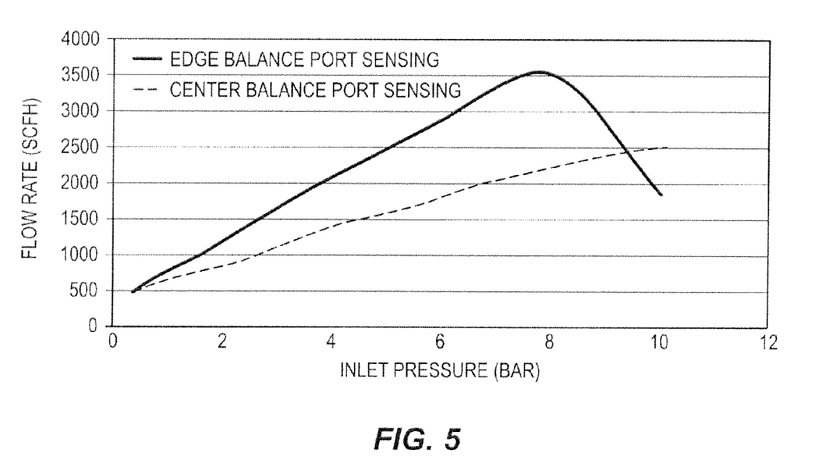
FIG. 5 is graph illustrating flow capacity versus inlet pressure of the balanced port control assembly of FIG. 4.

With the balanced port control assembly 112 disclosed in FIG. 4 configured as described, testing has shown improved performance characteristics relative to the conventional assembly 12 described with reference to FIG. 2. For example, FIG. 5 illustrates a comparison in graphical form between the conventional control assembly 12 (solid line) and the control assembly 112 of FIG. 4 (dotted line). As can be seen, as the inlet pressure increases with the control assembly 112 of FIG. 4, the rated flow capacity continuously increases, without any drop off due to high pressures. This continuous increase in capacity is desirable for many applications.

While the balanced port control assembly 112 of the version depicted in FIG. 4 includes a valve plug 122 having at least one second pressure sensing passage 150 sealed with one or more seal members 156, an alternative version of the valve plug 122 could be constructed without the at least one second pressure sensing passage 150 at all. Thus, it should be appreciated that the version depicted in FIG. 4 can easily be obtained by modifying the conventional control assembly 12 depicted in FIG. 2. For example, starting with the control assembly 12 of FIG. 2, one or more seal members 156 could be inserted into the one or more inlet portions 56a to thereby seal the one or more pressure sensing passages 56. Additionally, the conventional fastener, which is illustrated in FIG. 2 as securing the valve plug 42 to the valve stem 44, can be removed and replaced with the fastener 128 described with reference to FIG. 4. So configured, the fastener 128 can provide the desired first pressure sensing passage 138 to provide the desired fluid communication to the balancing cavity 54. Thus, it can be seen that the present disclosure also provides for a simple method and/or means for retro-fitting or upgrading a convention assembly 12.

Figure 6:
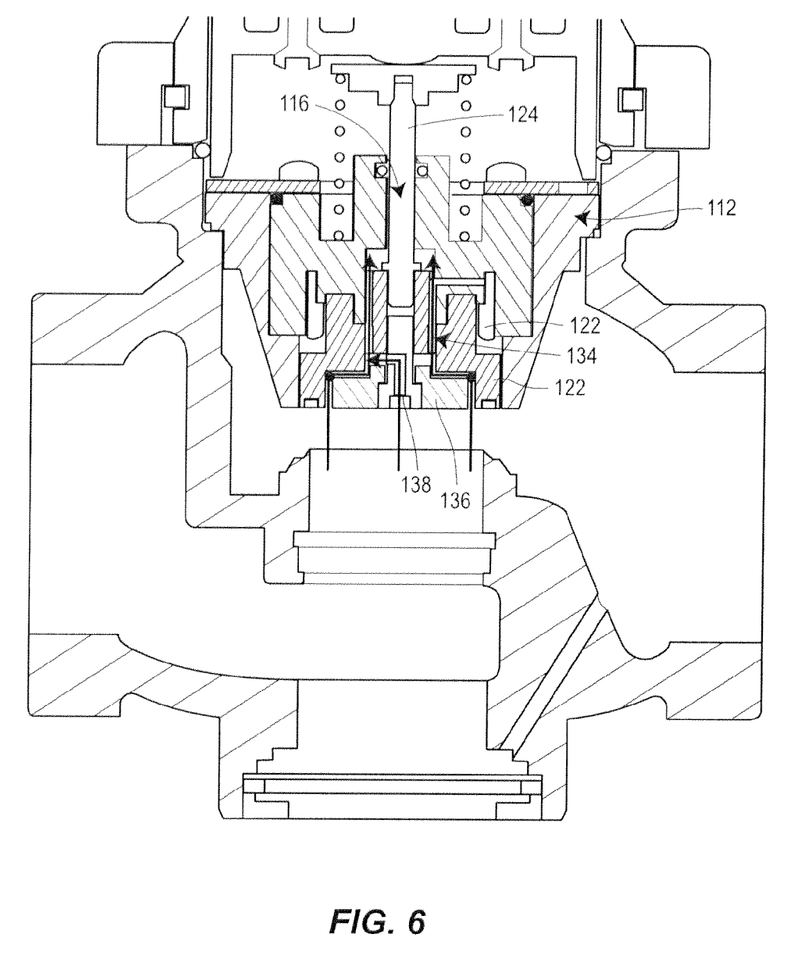
FIG. 6 is a cross-sectional side view of a second version of a balanced port control assembly of the present disclosure adapted for use in a regulator such as that depicted in FIG. 1, for example.

FIG. 6 depicts another version of the balanced port control assembly 112 of FIG. 4, with the only distinction being that the seal member 156 has been removed from the at least one second pressure sensing passage 150 of the pressure sensing labyrinth 134. So configured, fluid pressure at the sealing surface 136 of the valve plug 122 can freely communicate with the balancing cavity 132 in the port housing 114 via both the first pressure sensing passage 138 and the at least one second pressure sensing passage 150.

Figure 7:
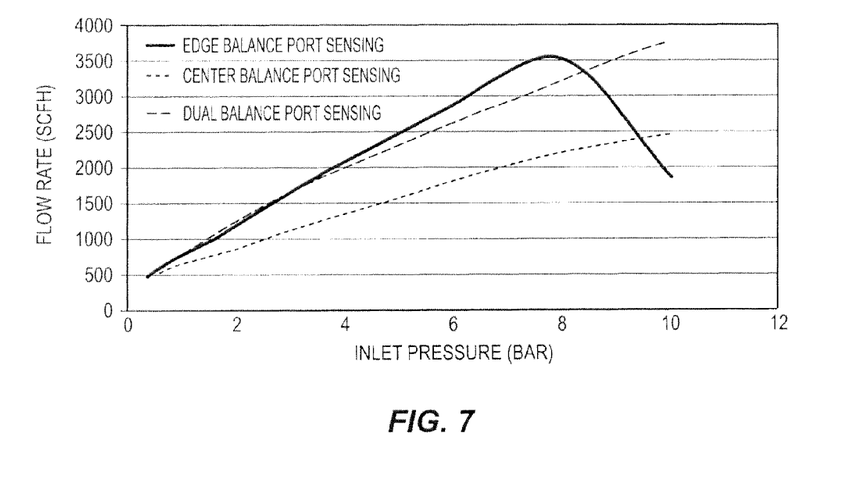
FIG. 7 is graph illustrating flow capacity versus inlet pressure of the balanced port control assembly of FIG. 6.

With the balanced port control assembly 112 disclosed in FIG. 6, testing has shown improved performance characteristics relative to the conventional assembly 12 described with reference to FIG. 2 and relative to the balanced port control assembly 112 of FIG. 4. For example, FIG. 7 illustrates a comparison in graphical form between the conventional control assembly 12 (solid line), the control assembly 112 of FIG. 4 (dotted line), and the control assembly 112 of FIG. 6 (dashed line). As can be seen, as the inlet pressure increases with the control assembly 112 of FIG. 6, the rated flow capacity continuously increases without any drop off due to high pressures, similar to that for the control assembly of FIG. 4. This continuous increase in capacity is desirable for many applications, as mentioned above. Additionally, as compared the control assembly of FIG. 4, the control assembly of FIG. 6 also exhibits an overall rated capacity across inlet pressures that is comparable to the rated capacities of the conventional control assembly 12. Thus, in addition to providing the advantages of continuously increasing rated capacity, the control assembly 112 of FIG. 6 does so at higher rated capacities, which can also be desirable in certain situations.

While the control assemblies 112 described herein have been described as including the fastener 128 defining the bore 140 for the portion of the pressure sensing labyrinth 134 that extends along the central longitudinal axis A of the control element 116, other variations are intended to be within the scope of the disclosure. For example, in some versions of the assembly 112, the valve plug 122 and valve stem 124 can be constructed as one piece such that the fastener 128 is not needed. In such instances, the bore 140 defining the first pressure sensing passage 138 as extending along the central longitudinal axis A can be formed, by machining or otherwise, directly into the control element 116.

Thus, from the foregoing, it should be appreciated that the balanced valve port control assemblies 112 (FIG. 4 and FIG. 6) advantageously provide for a continuous increase in rated flow capacity across a variety of inlet pressures, including inlet pressures above 8 bars. This ensure optimal operational performance in many situations. Furthermore, the control assembly of FIG. 6 provides for the continuous increase in rated capacities at overall higher rated capacities than the version of FIG. 4, thereby resembling the actual rated flow capacities of conventional balanced valve port control assemblies 12.

We claim:

1. A fluid regulating device comprising: a valve body defining an inlet, an outlet, and a valve port disposed between the inlet and the outlet; a port housing disposed in the valve body and defining a central cylindrical opening; a control element at least partly slidably disposed in the central cylindrical opening of the port housing and adapted for displacement along a central axis of the control element between a closed position engaging the valve port and an open position spaced away from the valve port, wherein the control element comprises a valve stem and a valve plug coupled to the valve stem, the valve plug defining a sealing surface adapted to sealingly engage the valve port when the control element is in the closed position; a balancing diaphragm coupled between the control element and the port housing, the balancing diaphragm having opposite first and second diaphragm surfaces; a balancing cavity defined in a portion of the port housing between an inner surface of the port housing and the first diaphragm surface of the balancing diaphragm; and a first pressure sensing passage extending through the valve plug and in fluid communication with the balancing cavity such that a fluid pressure resident on the sealing surface of the valve plug is equal to a fluid pressure resident in the balancing cavity to apply equal and opposite first and second forces to the sealing surface of the valve plug and the first surface of the balancing diaphragm, respectively, the first pressure sensing passage having an inlet portion extending through the valve plug along the central axis of the control element, and wherein the valve plug comprises at least one of:
   (a) a central bore extending along the central axis of the control element and a plug fastener disposed in the central bore and fixing the valve plug to the valve stem, the plug fastener defining at least a portion of the inlet portion of the first pressure sensing passage; and
   (b) an outer plug portion, an inner plug portion disposed radially inside of the outer plug portion, and at least one intermediate passage disposed between an outer wall of the inner plug portion and an inner wall of the outer plug portion, wherein the at least one intermediate passage defines at least one second pressure sensing passage extending through the valve plug and in fluid communication with the balancing cavity.

2. The device of claim 1, wherein valve plug comprises (b) and further comprising a sealing member disposed within the at least one intermediate passage and providing a fluid tight seal between the inner and outer plug portions.

3. The device of claim 2, wherein the at least one intermediate passage comprises a hollow cylindrical space disposed between the inner and outer plug portions.

4. The device of claim 3, wherein the sealing member comprises an o-ring disposed within the hollow cylindrical space.

5. A balanced port control assembly for a fluid flow control device, the assembly comprising: a port housing defining a central cylindrical opening; a valve stem having a central longitudinal axis and at least partly disposed in the port housing for reciprocating displacement along the central longitudinal axis; a valve plug coupled to the valve stem and defining a sealing surface adapted to selectively sealingly engage a valve port of the fluid flow control device; a balancing diaphragm operably coupled between the valve plug and the port housing, the balancing diaphragm having opposite first and second diaphragm surfaces; a balancing cavity defined in a portion of the port housing between an inner surface of the port housing and the first diaphragm surface of the balancing diaphragm; and a first pressure sensing passage extending through the valve plug and in fluid communication with the balancing cavity such that a fluid pressure resident on the sealing surface of the valve plug is equal to a fluid pressure resident in the balancing cavity to apply equal and opposite first and second forces to the sealing surface of the valve plug and the first surface of the balancing diaphragm, respectively, the first pressure sensing passage having an inlet portion extending through the valve plug along the central longitudinal axis of the valve stem~and wherein the valve plug comprises at least one of:
   (a) a central bore extending along the central axis of the control element and a plug fastener disposed in the central bore and fixing the valve plug to the valve stem, the plug fastener defining at least a portion of the inlet portion of the first pressure sensing passage; and
   (b) an outer plug portion, an inner plug portion disposed radially inside of the outer plug portion, and at least one intermediate passage disposed between an outer wall of the inner plug portion and an inner wall of the outer plug portion, wherein the at least one intermediate passage defines at least one second pressure sensing passage extending through the valve plug and in fluid communication with the balancing cavity.

6. The assembly of claim 5, wherein the valve plug comprises (b) and further comprising a sealing member disposed within the at least one intermediate passage and providing a fluid tight seal between the inner and outer plug portions.

7. The assembly of claim 6, wherein the at least one intermediate passage comprises a hollow cylindrical space disposed between the inner and outer plug portions.

8. The assembly of claim 7, wherein the sealing member comprises an o-ring disposed within the hollow cylindrical space.

9. A balanced port control assembly for a fluid flow control device, the assembly comprising: a port housing defining a central cylindrical opening; a valve stem having a central longitudinal axis and at least partly disposed in the port housing for reciprocating displacement along the central longitudinal axis; a valve plug coupled to the valve stem and defining a sealing surface adapted to selectively sealingly engage a valve port of the fluid flow control device; a balancing diaphragm operably coupled between the valve plug and the port housing, the balancing diaphragm having opposite first and second diaphragm surfaces; a balancing cavity defined in a portion of the port housing between an inner surface of the port housing and the first diaphragm surface of the balancing diaphragm; and a pressure sensing labyrinth defined at least partly by the valve plug and providing fluid communication between the sealing surface of the valve plug and the balancing cavity such that fluid pressure resident on the sealing surface of the valve plug is equal to fluid pressure resident in the balancing cavity to apply equal and opposite first and second forces to the sealing surface of the valve plug and the first surface of the balancing diaphragm, respectively, the pressure sensing labyrinth comprising at least one first pressure sensing passage extending from the sealing surface and into the valve plug along the central axis of the valve stem and including at least one of:

(a) wherein the pressure sensing labyrinth further comprises at least one second pressure sensing passage providing fluid communication between the sealing surface of the valve plug and the balancing cavity, at least a portion of the at least one second pressure sensing passage defined by the valve plug and disposed parallel to the first pressure sensing passage, (b) further comprising a seal member disposed in the at least one second pressure sensing passage and providing a fluid tight seal, and (c) wherein the valve plug further comprises a central bore extending along the central axis of the control element and a plug fastener disposed in the central bore and fixing the valve plug to the valve stem, the plug fastener defining at least a portion of the inlet portion of the first pressure sensing labyrinth.

10. The assembly of claim 9, wherein the pressure sensing labyrinth comprises the at least one second pressure sensing passage and wherein the valve plug comprises an outer plug portion and an inner plug portion disposed radially inside of the outer plug portion.

11. The assembly of claim 10, wherein the first pressure sensing passage of the pressure sensing labyrinth is disposed through the inner plug portion and the at least one second pressure sensing passage of the pressure sensing labyrinth is disposed between the inner and outer plug portions.

12. The assembly of claim 10, wherein the at least one second pressure sensing passage comprises a hollow cylindrical space defined between an outer cylindrical surface of the inner plug portion and an inner cylindrical surface of the outer plug portion.

* * * * *

UNITED STATES PATENT AND TRADEMARK OFFICE
CERTIFICATE OF CORRECTION

PATENT NO. : 8,944,089 B2  
APPLICATION NO. : 13/659041  
DATED : February 3, 2015  
INVENTOR(S) : Tung K. Nguyen et al.

Page 1 of 1

It is certified that error appears in the above-identified patent and that said Letters Patent is hereby corrected as shown below:

In the Specification:

At Column 6, line 13, "passage 128" should be -- passage 138 --.

At Column 6, line 25, "member 150" should be -- member 156 --.

In the Claims:

At Column 8, line 57, "stem~and" should be -- stem, and --.

At Column 10, line 2, "stem and" should be -- stem, and --.

Signed and Sealed this  
Twenty-third Day of February, 2016

Michelle K. Lee  
*Director of the United States Patent and Trademark Office*